US010788646B2

(12) United States Patent
Tseng et al.

(10) Patent No.: US 10,788,646 B2
(45) Date of Patent: Sep. 29, 2020

(54) LENS DRIVING APPARATUS, PHOTOGRAPHING MODULE AND ELECTRONIC DEVICE

(71) Applicant: LARGAN DIGITAL CO., LTD., Taichung (TW)

(72) Inventors: Te-Sheng Tseng, Taichung (TW); Wen-Hung Hsu, Taichung (TW); Yung-Chun Kang, Taichung (TW)

(73) Assignee: LARGAN DIGITAL CO., LTD., Taichung (TW)

( * ) Notice: Subject to any disclaimer, the term of this patent is extended or adjusted under 35 U.S.C. 154(b) by 421 days.

(21) Appl. No.: 15/789,202

(22) Filed: Oct. 20, 2017

(65) Prior Publication Data
US 2018/0372987 A1 Dec. 27, 2018

(30) Foreign Application Priority Data

Jun. 27, 2017 (TW) .............................. 106209363 U

(51) Int. Cl.
*G02B 7/02* (2006.01)
*G02B 15/14* (2006.01)
*G02B 7/09* (2006.01)
*H02K 41/035* (2006.01)
*G03B 13/36* (2006.01)
(Continued)

(52) U.S. Cl.
CPC ................. *G02B 7/09* (2013.01); *G03B 3/10* (2013.01); *G03B 5/00* (2013.01); *G03B 13/36* (2013.01); *H02K 41/0356* (2013.01); *G03B 2205/0007* (2013.01); *G03B 2205/0069* (2013.01); *G03B 2217/005* (2013.01)

(58) Field of Classification Search
CPC . G02B 7/08; G02B 7/021; G02B 7/02; G02B 7/023; G02B 7/04; G02B 7/102; G02B 3/00; G02B 15/173; G02B 7/10; G11B 7/0932; G11B 7/0935
USPC ................ 359/811–830, 694, 642, 696, 676, 359/699–701
See application file for complete search history.

(56) References Cited

U.S. PATENT DOCUMENTS 8,749,643 B2   6/2014  Lim et al.
9,001,224 B2   4/2015  Moriya et al.
(Continued)

FOREIGN PATENT DOCUMENTS

CN   103901701 A   7/2014
CN   102472944 B   10/2015
CN   102645815 B   1/2016

*Primary Examiner* — Dawayne Pinkney
(74) *Attorney, Agent, or Firm* — McClure, Qualey & Rodack, LLP

(57) ABSTRACT

A lens driving apparatus is for driving a lens assembly and includes a base, a metal cover, a carrier, a first coil, at least one first magnet, at least one second magnet, a frame and a spring set. At least one lower leaf spring of the spring set includes a frame connecting section, a carrier connecting section and a resilient section. The carrier connecting section and the second magnet are arranged along the first direction. The carrier connecting section includes an opening portion and a shielding portion, and the opening portion and the shielding portion both corresponding to the second magnet along the first direction are respectively for a part of the second magnet to be exposed through the opening portion and another part of the second magnet to be shielded by the shielding portion.

19 Claims, 17 Drawing Sheets

(51) Int. Cl.
    *G03B 5/00*    (2006.01)
    *G03B 3/10*    (2006.01)

(56) References Cited

U.S. PATENT DOCUMENTS

| | | |
|---|---|---|
| 9,013,588 B2 | 4/2015 | Moriya et al. |
| 9,046,642 B2 | 6/2015 | Sugawara et al. |
| 9,360,653 B2 | 6/2016 | Lee et al. |
| 9,377,632 B2 | 6/2016 | Hu et al. |
| 9,405,088 B2 | 8/2016 | Hayashi et al. |
| 9,455,617 B2 | 9/2016 | Park |
| 9,547,216 B2 | 1/2017 | Jung et al. |
| 9,575,285 B2 | 2/2017 | Dong et al. |
| 9,591,221 B2 | 3/2017 | Miller et al. |
| 2011/0097062 A1* | 4/2011 | Tsuruta ................. G02B 7/022 396/55 |
| 2016/0182775 A1* | 6/2016 | Cho .................... H04N 5/2252 348/208.99 |
| 2016/0231528 A1 | 8/2016 | Wong et al. |
| 2016/0313568 A1* | 10/2016 | Ichihashi ............. G02B 27/646 |
| 2017/0115463 A1 | 4/2017 | Osaka et al. |
| 2017/0115466 A1 | 4/2017 | Murakami et al. |
| 2018/0234629 A1* | 8/2018 | Tseng ...................... G03B 5/00 |

* cited by examiner

LENS DRIVING APPARATUS, PHOTOGRAPHING MODULE AND ELECTRONIC DEVICE

RELATED APPLICATIONS

This application claims priority to Taiwan Application Serial Number 106209363, filed Jun. 27, 2017, which is herein incorporated by reference.

BACKGROUND

Technical Field

The present disclosure relates to a lens driving apparatus and a photographing module. More particularly, the present disclosure relates to a lens driving apparatus and a photographing module which are applicable to portable electronic devices.

Description of Related Art

In general, the voice coil motor (VCM) acting as a lens driving apparatus is applied to the lens assembly in the electronic device for providing an auto-focusing function, and at least one leaf spring of the lens driving apparatus is assembled on the carrier. When the leaf spring is deformed by force to provide degrees of freedom and restoring force for the carrier, the lens assembly can be carried to be displaced by the carrier so as to achieve the auto-focusing function.

However, this kind of lens driving apparatus usually includes quite numerous parts. In order to meet the demands of accurate and smooth displacement of the lens assembly, it is required lots of alignment and calibration steps during the assembling procedure of the lens driving apparatus so as to finish accurately assembling the lens driving apparatus from the parts one by one. Thus, it limits the production efficiency of the lens driving apparatus and affects the manufacturing cost thereof.

Given the above, how to improve the production efficiency while maintaining the assembling accuracy, enhance the image quality of the photographing module, and thereby satisfy of the requirements of the electronic devices in high-end imaging and the optical anti-shake function has become one of the important subjects.

SUMMARY

According to one aspect of the present disclosure, a lens driving apparatus is for driving a lens assembly and includes a base, a metal cover, a carrier, a first coil, at least one first magnet, at least one second magnet, a frame and a spring set. The base includes a base opening. The metal cover couples to the base and includes a cover opening, wherein the cover opening is disposed correspondingly to the base opening. The carrier has a central axis, wherein the carrier is for being assembled with the lens assembly, the carrier is displaceable relative to the base and disposed in the metal cover, and the carrier is displaceable at least along a first direction, which is parallel to the central axis. The first coil is wound around and fixedly disposed on the carrier. The first magnet is disposed around the first coil, wherein the first magnet is displaceable relative to the base and disposed in the metal cover, and the first magnet is displaceable at least along a second direction, which is vertical to the central axis. The second magnet is fixedly disposed on one side of the carrier close to the base, wherein the second magnet is displaceable with the carrier. The frame accommodates the first magnet to be fixedly disposed thereon. The spring set is connected to the carrier, wherein the spring set includes at least one upper leaf spring and at least one lower leaf spring, the upper leaf spring and the lower leaf spring are arranged along the first direction, the lower leaf spring is disposed on the side of the carrier close to the base, and the lower leaf spring includes a frame connecting section, a carrier connecting section and a resilient section. The frame connecting section is fixedly connected to the frame. The carrier connecting section is fixedly connected to the carrier, wherein the carrier connecting section and the second magnet are arranged along the first direction, the carrier connecting section includes an opening portion and a shielding portion, and the opening portion and the shielding portion both corresponding to the second magnet along the first direction are respectively for a part of the second magnet to be exposed through the opening portion and another part of the second magnet to be shielded by the shielding portion. The resilient section connects the frame connecting section and the carrier connecting section.

According to another aspect of the present disclosure, a photographing module includes the lens driving apparatus according to the foregoing aspect, the lens assembly and an image sensor. The lens assembly is assembled with the carrier of the lens driving apparatus. The image sensor is attached to the base of the lens driving apparatus and for receiving an imaging light from the lens assembly.

According to another aspect of the present disclosure, an electronic device includes the photographing module according to the foregoing aspect.

DETAILED DESCRIPTION

1st Embodiment

Figure 1:
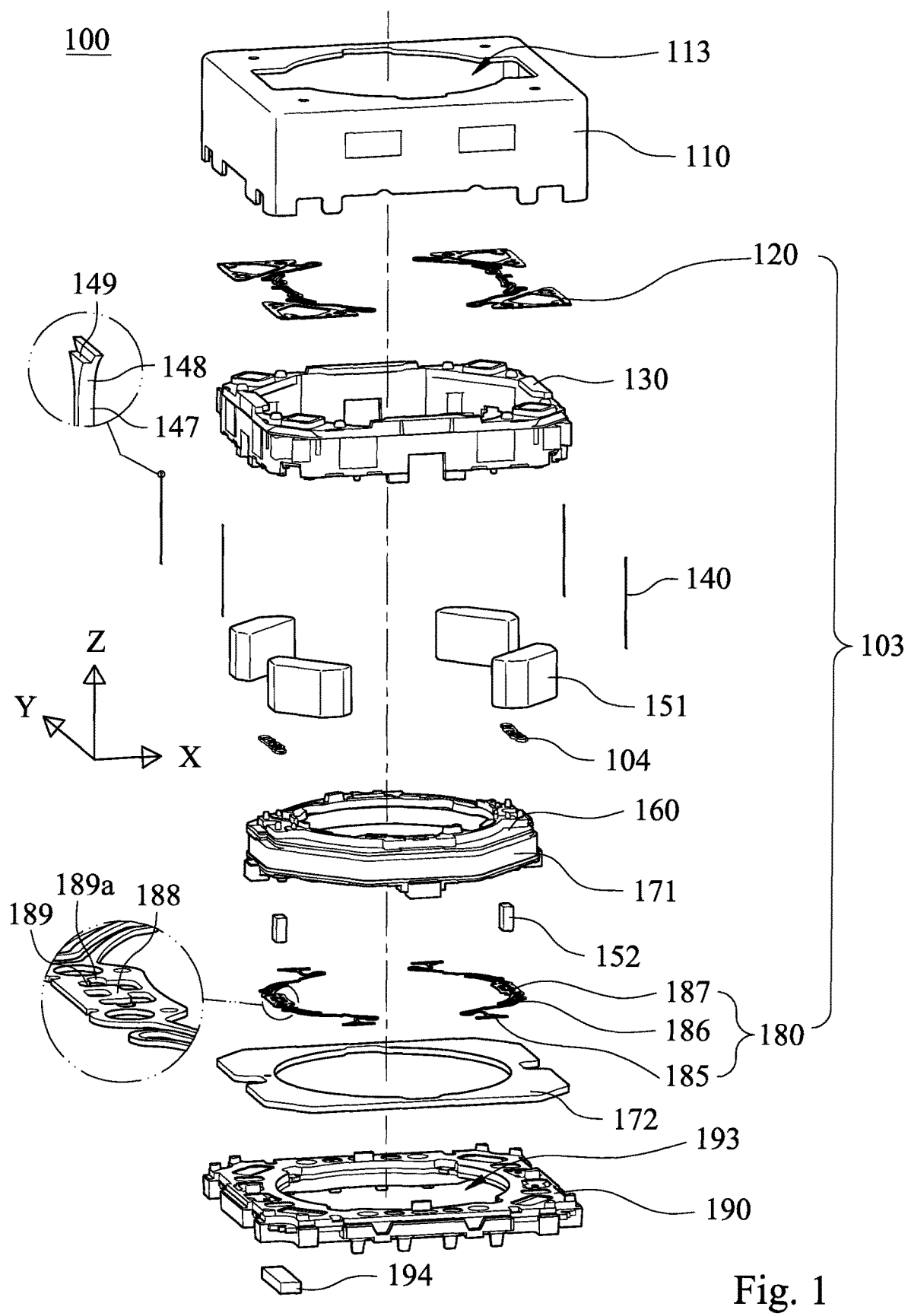
FIG. 1 is an exploded view of a lens driving apparatus according to the 1st embodiment of the present disclosure.
Figure 2:
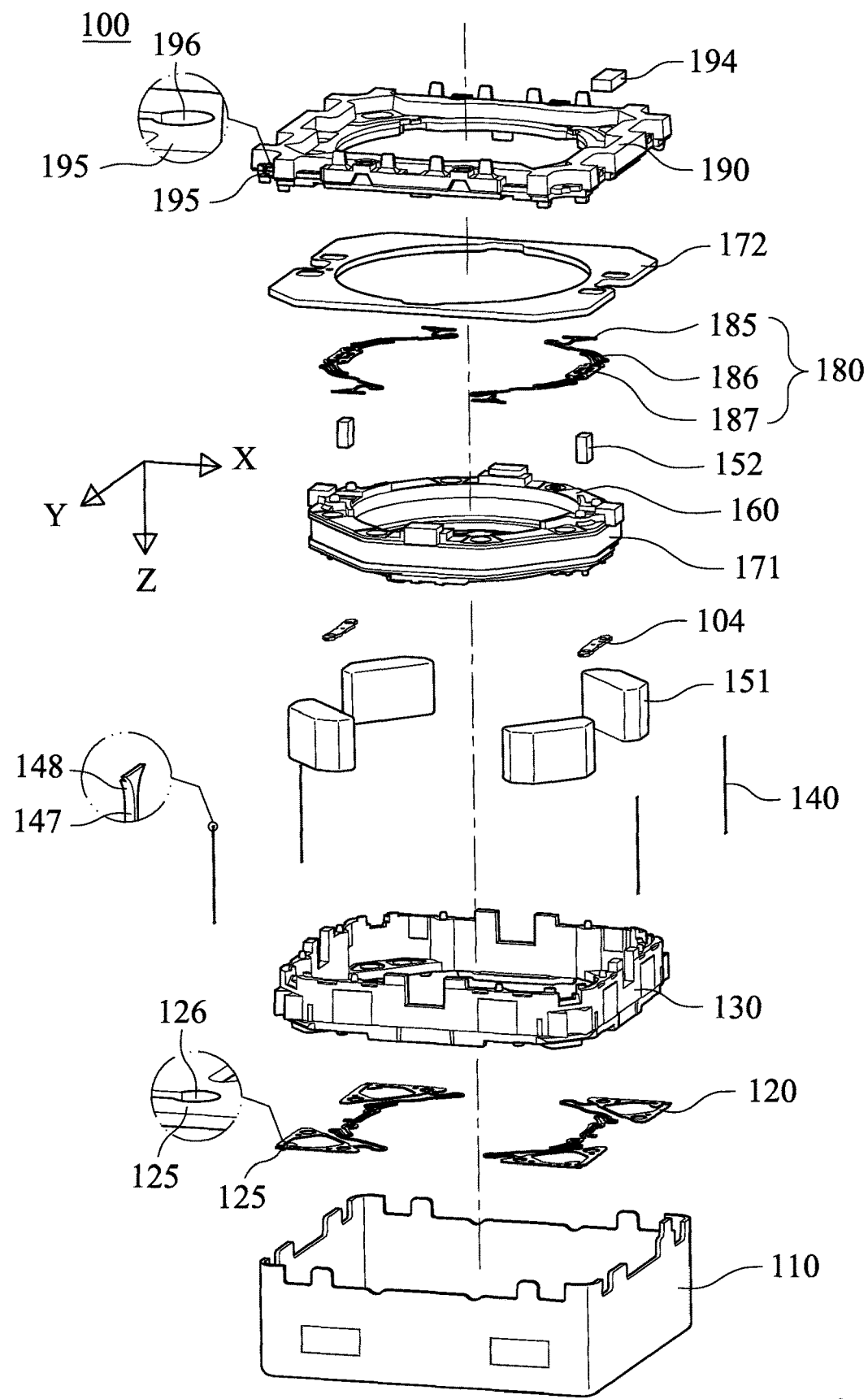
FIG. 2 is another exploded view of the lens driving apparatus according to the 1st embodiment.
Figure 3:
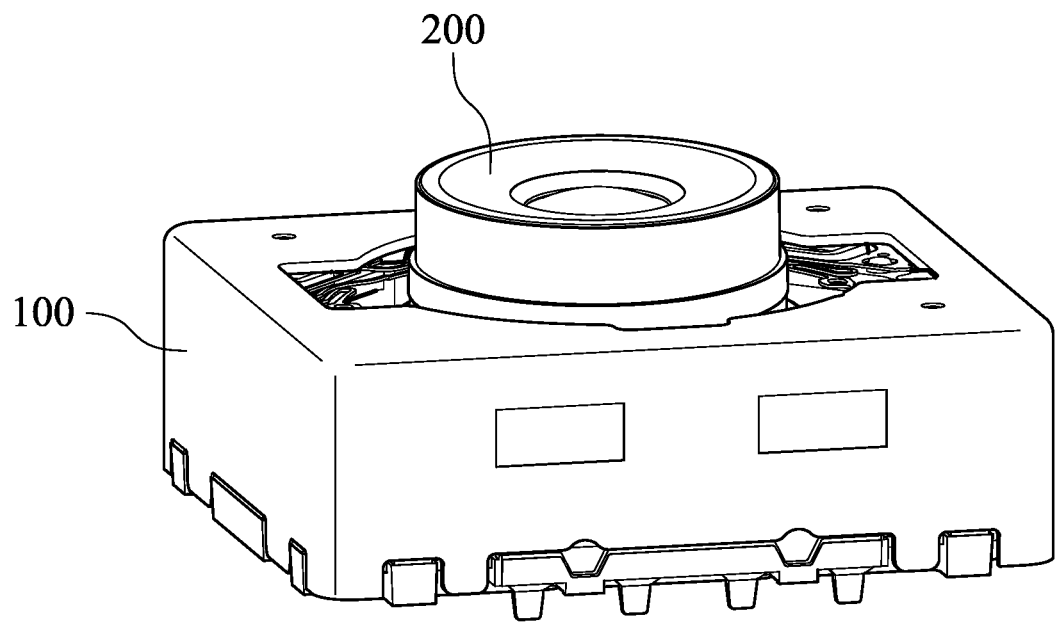
FIG. 3 is a three-dimensional view of the lens driving apparatus according to the 1st embodiment which is assembled to a lens assembly.

FIG. 1 is an exploded view of a lens driving apparatus 100 according to the 1st embodiment of the present disclosure, FIG. 2 is another exploded view of the lens driving apparatus 100 according to the 1st embodiment, and FIG. 3 is a three-dimensional view of the lens driving apparatus 100 according to the 1st embodiment which is assembled to a lens assembly 200. In FIG. 1 to FIG. 3, the lens driving apparatus 100 is for driving the lens assembly 200 and includes a base 190, a metal cover 110, a carrier 160, a first coil 171, at least one first magnet 151, at least one second magnet 152, a frame 130 and a spring set 103.

The base 190 includes a base opening 193. The metal cover 110 couples to the base 190, that is, the metal cover 110 is disposed correspondingly to the base 190, and thereby an accommodating space is formed. The metal cover 110 includes a cover opening 113, wherein the cover opening 113 is disposed correspondingly to the base opening 193. Furthermore, the metal cover 110 may be made of a metal material overall, or made of a metal material with just a part thereof, such as being processed with a metal coating or a metal painting on a surface of a nonmetal material.

The carrier 160 has a central axis (its reference numeral is omitted), which is also an optical axis of the lens assembly 200. The carrier 160 is for being assembled with the lens assembly 200. The carrier 160 is displaceable relative to the base 190 and disposed in the metal cover 110, and the carrier 160 is displaceable at least along a first direction Z, which is parallel to the central axis. The first coil 171 is wound around and fixedly disposed on the carrier 160. The at least one first magnet 151 is disposed around the first coil 171, wherein the first magnet 151 is displaceable relative to the base 190 and disposed in the metal cover 110, and the first magnet 151 is displaceable at least along a second direction X, which is vertical to the central axis. The frame 130 accommodates the first magnet 151, and the frame 130 provides the first magnet 151 to be fixedly disposed on the frame 130. Furthermore, the first magnet 151 may be displaceable along two second directions X and Y, which are both vertical to the central axis. That is, the second directions X and Y are both orthogonal to the first direction Z. The second directions X and Y may be not orthogonal to each other, or alternatively the second directions X and Y may be orthogonal to each other. In the 1st embodiment, the second directions X and Y are both orthogonal to the first direction Z, and the second directions X and Y are orthogonal to each other. The carrier 160 is displaceable along the first direction Z, the second directions X and Y relative to the base 190. A number of the first magnet 151 is four, and the first magnets 151 are displaceable along the second directions X and Y relative to the base 190.

The at least one second magnet 152 is fixedly disposed on one side of the carrier 160 close to the base 190, wherein the second magnet 152 is displaceable with the carrier 160. Furthermore, a number of the second magnet 152 may be one so as to increase the assembling smoothness of the lens driving apparatus 100. The number of the second magnet 152 may be two as disclosed in the 1st embodiment.

The spring set 103 is connected to the carrier 160, so that the carrier 160 is carried to be displaced along the first direction Z by the spring set 103, that is, the spring set 103 provides the carrier 160 with a degree of freedom to be displaced along the first direction Z. The spring set 103 includes at least one upper leaf spring 120 and at least one lower leaf spring 180, wherein the upper leaf spring 120 and the lower leaf spring 180 are arranged along the first direction Z. In the 1st embodiment, a number of the upper leaf spring 120 is two, and a number of the lower leaf spring 180 is two. In addition, the upper leaf spring and the lower leaf spring herein are the idiomatic expressions in the art, wherein the upper leaf spring indicates a leaf spring of the spring set, which is far from the base (i.e. close to an object side), the lower leaf spring indicates another leaf spring of the spring set, which is close to the base (i.e. close to an image side), and the upper leaf spring and the lower leaf spring do not indicate being disposed at an absolutely upper position and an absolutely lower position respectively.

Figure 4:
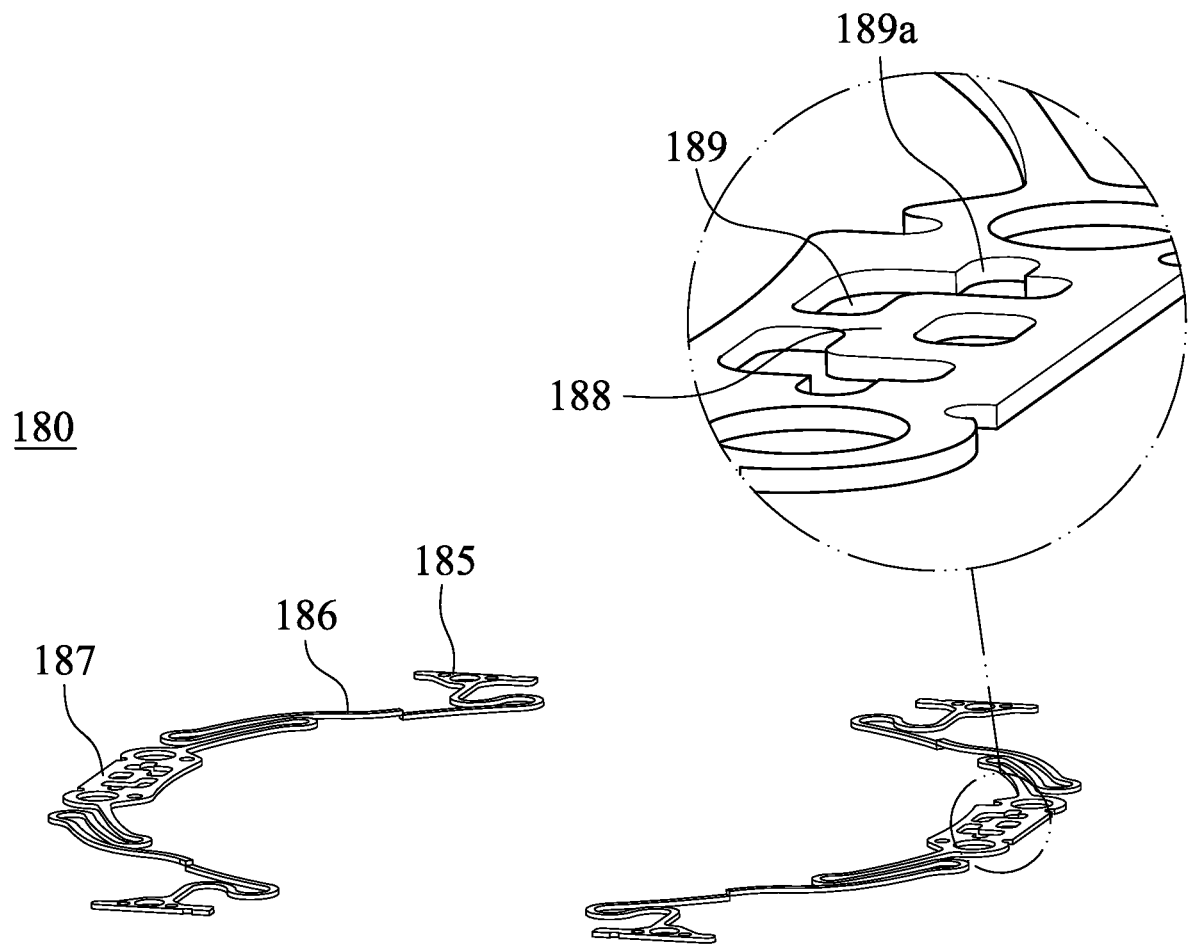
FIG. 4 is a three-dimensional view of a lower leaf spring according to the 1st embodiment.
Figure 5:
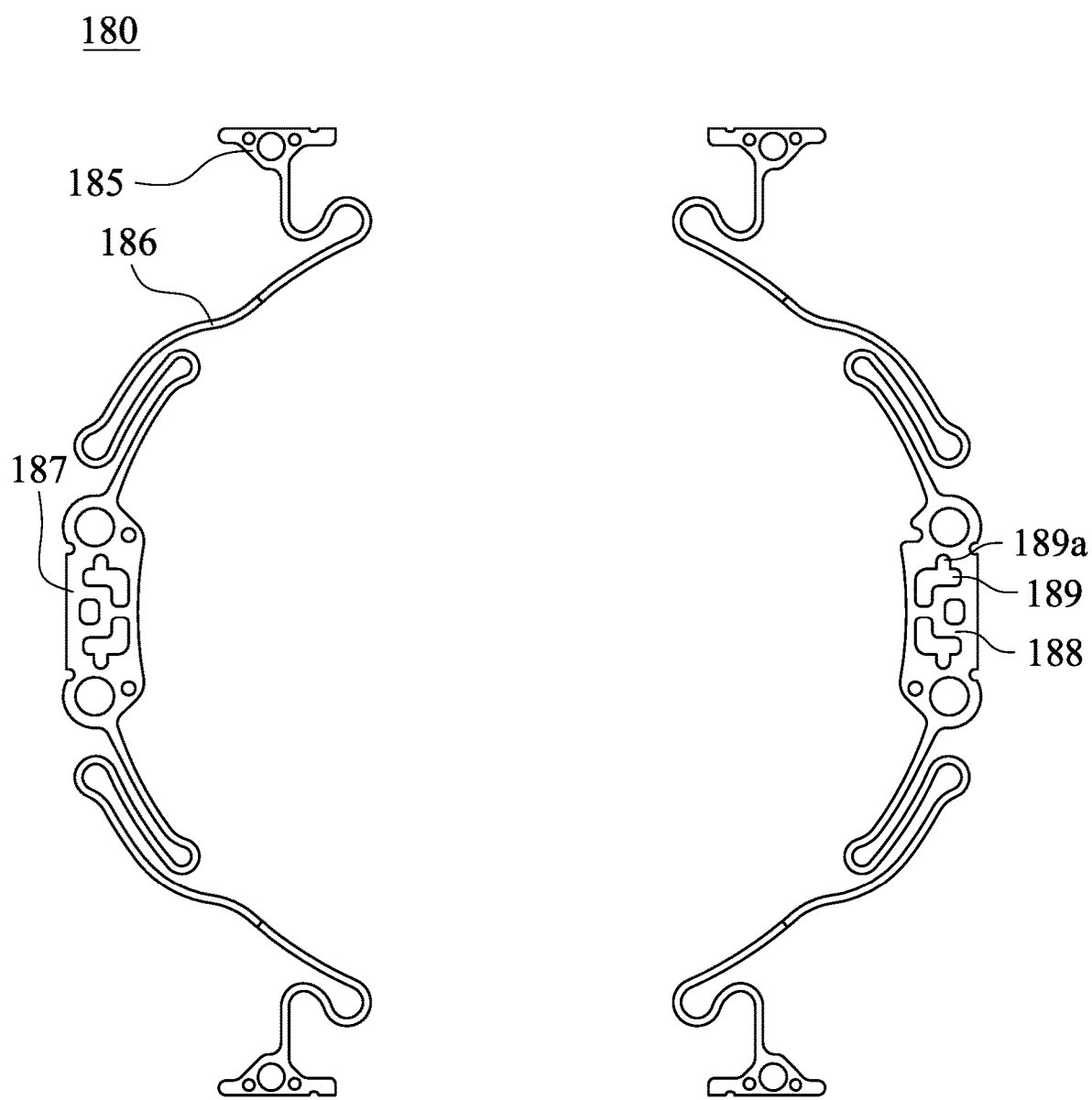
FIG. 5 is a bottom view of the lower leaf spring according to the 1st embodiment.
Figure 6:
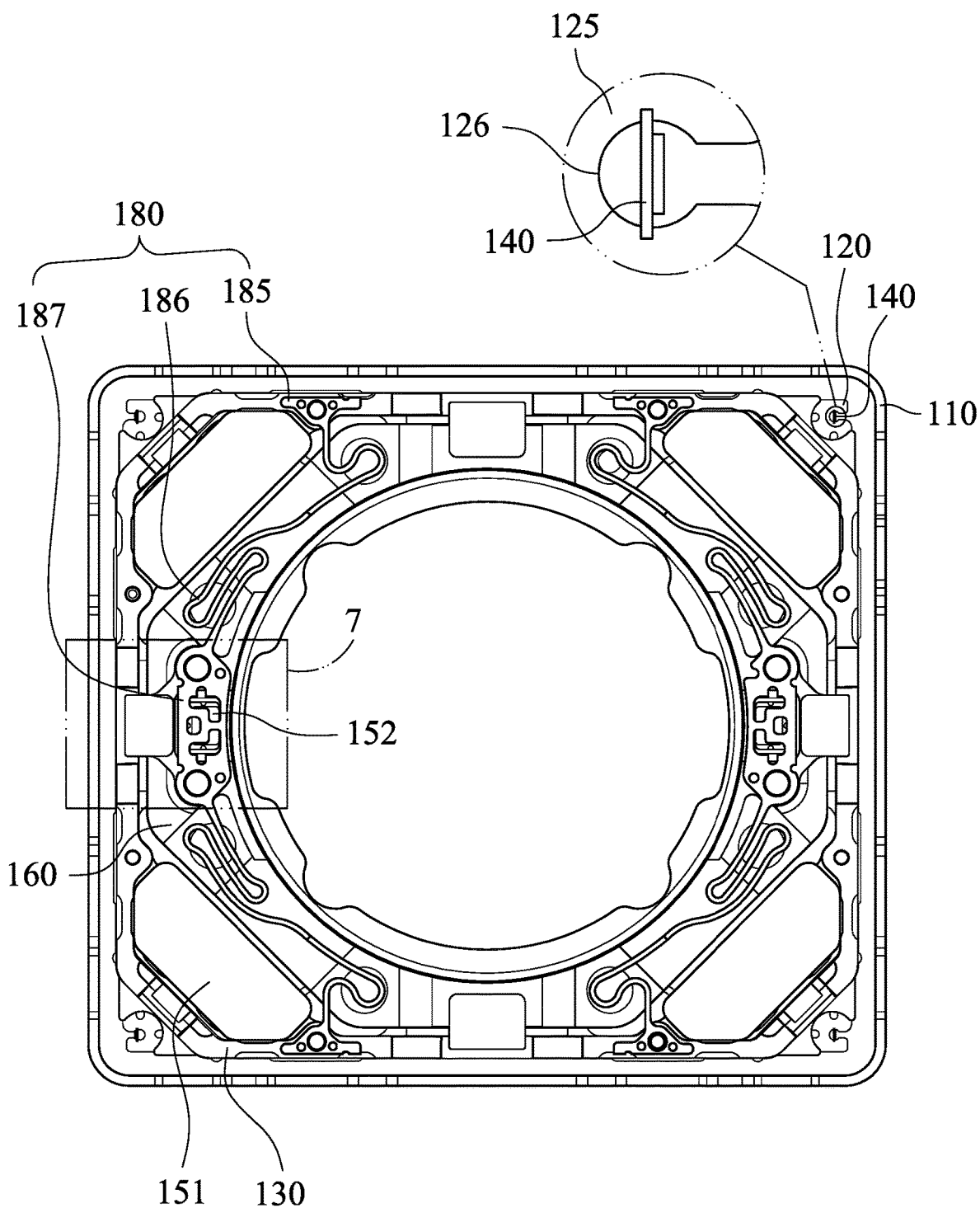
FIG. 6 is a bottom view of part of the lens driving apparatus according to the 1st embodiment.
Figure 7:
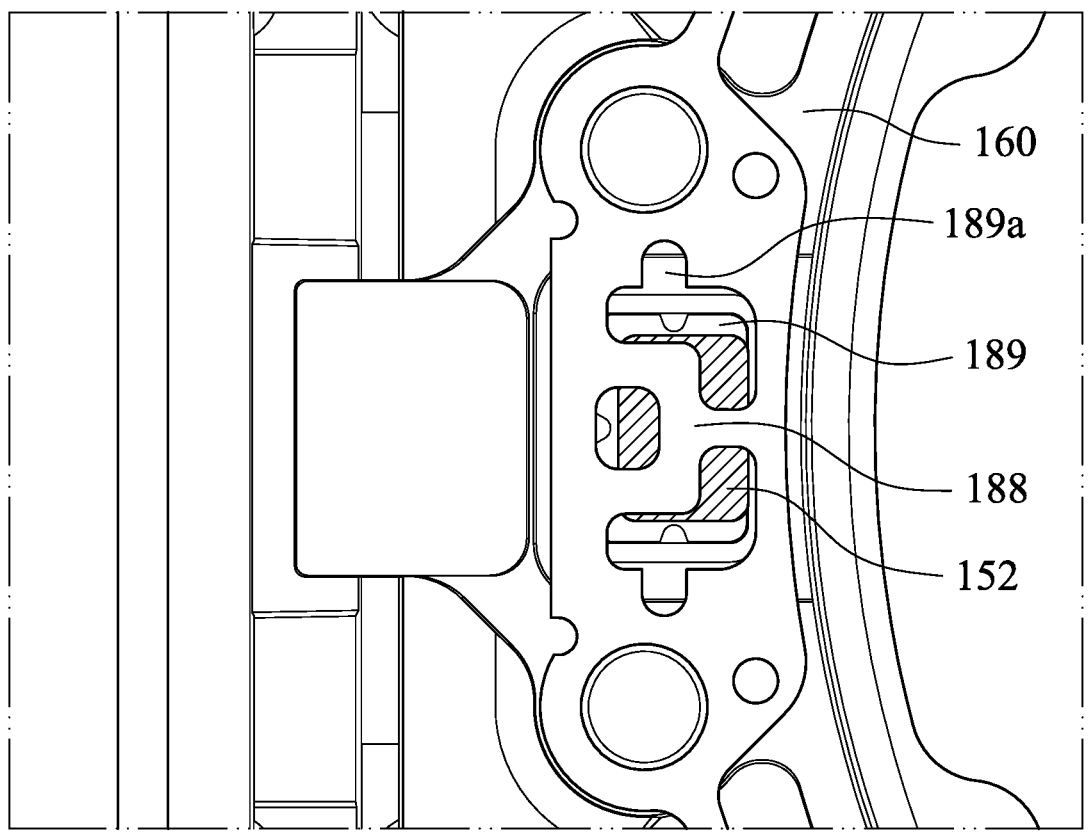
FIG. 7 is an enlarged view of part 7 in FIG. 6.

FIG. 4 is a three-dimensional view of the lower leaf springs 180 according to the 1st embodiment, FIG. 5 is a bottom view of the lower leaf springs 180 according to the 1st embodiment, FIG. 6 is a bottom view of part of the lens driving apparatus 100 according to the 1st embodiment, and FIG. 7 is an enlarged view of part 7 in FIG. 6, wherein the bottom view of the present disclosure indicates being viewed from the base 190 along the first direction Z, and FIG. 6 is the bottom view of the lens driving apparatus 100 according to the 1st embodiment excluding a position detection unit 194, the base 190 and a second coil 172 thereof. In FIG. 2 and FIG. 4 to FIG. 7, each of the lower leaf springs 180 is disposed on the side of the carrier 160 close to the base 190 and includes two frame connecting sections 185, a carrier connecting section 187 and two resilient sections 186. The frame connecting sections 185 are fixedly connected to the frame 130. The carrier connecting section 187 is fixedly connected to the carrier 160. Each of the resilient sections 186 connects one of the frame connecting sections 185 and the carrier connecting section 187. In the 1st embodiment, for each of the lower leaf springs 180, the frame connecting sections 185 are respectively located on two ends of the lower leaf spring 180, the carrier connecting sections 187 is located on a central part of the lower leaf spring 180, and each of the resilient sections 186 is located between one of the frame connecting sections 185 and the carrier connecting section 187.

The two carrier connecting sections 187 are respectively corresponding to the two second magnets 152, and each of the carrier connecting sections 187 and a corresponding one of the second magnets 152 are arranged along the first direction Z. Each of the carrier connecting sections 187 includes an opening portion 189 and a shielding portion 188, wherein the opening portion 189 and the corresponding one of the second magnets 152 are arranged along the first direction Z, and the shielding portion 188 and the corresponding one of the second magnets 152 are arranged along the first direction Z. That is, at least part of an area projected along the first direction Z (i.e. an area projected on a plane spanned by the second directions X and Y) of the opening portion 189 and at least part of an area projected along the first direction Z of the corresponding one of the second magnets 152 are overlapped. At least part of an area projected along the first direction Z of the shielding portion 188 and at least part of the area projected along the first direction Z of the corresponding one of the second magnets 152 are overlapped. Thus, the opening portion 189 and the shielding portion 188 are respectively for a part of the corresponding one of the second magnets 152 to be exposed through the opening portion 189 and another part of the corresponding one of the second magnets 152 to be shielded by the shielding portion 188. It can be said that a part of a surface close to the base 190 of the corresponding one of the second magnets 152 is exposed through the opening portion 189, and another part thereof is shielded by the shielding portion 188. It can be also said the opening portion 189 of each of the carrier connecting sections 187 enables the part of the corresponding one of the second magnets 152 to be exposed, and the shielding portion 188 thereof enables the another part of the corresponding one of the second magnets 152 to be shielded. Specifically, the opening portion 189 is an opening of each of the carrier connecting sections 187, and the opening portion 189 and the shielding portion 188 are both formed on the carrier connecting section 187 and adjacent to each other. In the 1st embodiment, for each of the carrier connecting sections 187, a number of the shielding portion 188 is one, and a number of the opening portion 189, which is formed by a shape of the shielding portion 188, is three.

In conventional lens driving apparatuses, a second magnet is fixedly disposed on a carrier without being aided by a lower leaf spring. Specifically, two series assembling steps shall be performed separately to assemble the second magnet and the lower leaf spring on the carrier. One of the two series assembling steps is preassembling at least one second magnet on the carrier, then performing the glue dispensing, alignment and calibration in sequence for the second magnet based on a number of the second magnet, and thereby the second magnet is fixedly disposed on the carrier. The other one of the two series assembling steps is preassembling at least one lower leaf spring on the carrier, then performing the glue dispensing, alignment and calibration in sequence for the lower leaf spring based on a number of the lower leaf spring, and thereby the lower leaf spring is fixedly connected to the carrier.

According to the lens driving apparatus 100 of the present disclosure, the second magnets 152 are aided by the shielding portions 188 to be fixedly disposed on the carrier 160, so that the two series assembling steps for the conventional lens driving apparatus could be reduced to only one series assembling step for the lens driving apparatus 100 of the present disclosure, which is preassembling the second magnets 152 and the lower leaf springs 180 on the carrier 160, then performing the glue dispensing, alignment and calibration in sequence only once for both the second magnets 152 and the lower leaf springs 180. Therefore, fixedly disposing the second magnets 152 on and fixedly connecting the lower leaf springs 180 to the carrier 160 simultaneously in the only one series assembling step is advantageous in increasing the production efficiency and reducing the cost of the lens driving apparatus 100 while maintaining the assembling accuracy. The normal operation between the second magnets 152 and the position detection unit 194 could be maintained via the opening portions 189. Furthermore, the preassembling manners of the second magnets 152 on the carrier 160 may be engaging, embedding, but not limited thereto.

Figure 8:
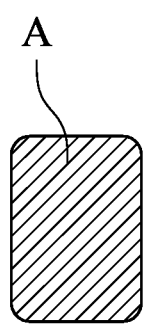
FIG. 8 is a schematic view of the parameter A of the lens driving apparatus according to the 1st embodiment.
Figure 9:
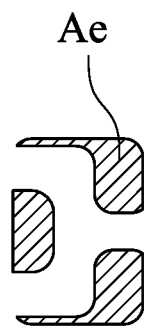
FIG. 9 is a schematic view of the parameter Ae of the lens driving apparatus according to the 1st embodiment.

In detail, FIG. 8 is a schematic view of a parameter A of the lens driving apparatus 100 according to the 1st embodiment, and FIG. 9 is a schematic view of a parameter Ae of the lens driving apparatus 100 according to the 1st embodiment. In FIG. 7 to FIG. 9, for every one of the second magnets 152 of the 1st embodiment, when an area projected along the first direction Z (i.e. an area projected on the plane spanned by the second directions X and Y, wherein a normal direction of the plane is parallel to the first direction Z) of the second magnet 152 is A, and an area projected along the first direction Z of the part of the second magnet 152 exposed through the opening portions 189 is Ae, the following condition may be satisfied: $10\% < (Ae/A) \times 100\% < 90\%$. Specifically in the 1st embodiment, the value of the parameter Ae is a sum of areas of the three opening portions 189 in FIG. 9. Therefore, it is favorable for the second magnets 152 to have an exposed area with an appropriate proportion so as to reduce the glue dispensing difficulties resulted from overly small exposed area, and reduce the glue material overflow resulted from overly large exposed area. Preferably, the following condition may be satisfied: $30\% < (Ae/A) \times 100\% < 70\%$.

Figure 10:
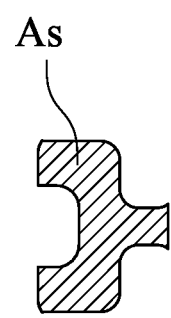
FIG. 10 is a schematic view of the parameter As of the lens driving apparatus according to the 1st embodiment.

FIG. 10 is a schematic view of a parameter As of the lens driving apparatus 100 according to the 1st embodiment. In FIG. 7 to FIG. 10, for every one of the second magnets 152 of the 1st embodiment, when an area projected along the first direction Z of the another part of the second magnet 152 shielded by the shielding portion 188 is As, and the area projected along the first direction Z of the part of the second magnet 152 exposed through the opening portions 189 is Ae, the following condition may be satisfied: $0.5 < As/Ae < 2.0$. Therefore, an appropriate proportion of the shielding portion 188 to the opening portions 189 is advantageous in maintaining the flatness of each of the lower leaf springs 180.

Figure 11:
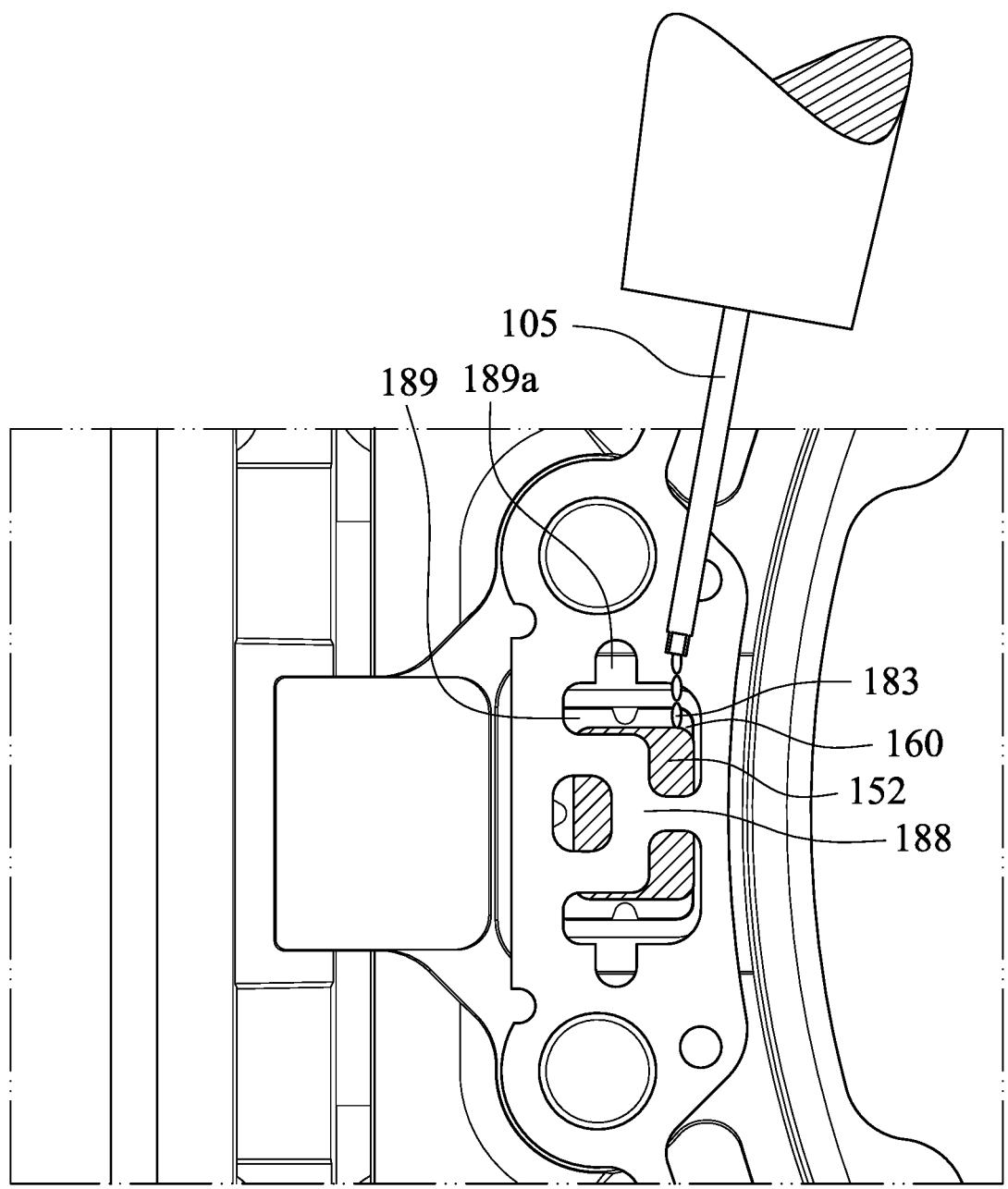
FIG. 11 is a schematic view of dispensing a glue material according to the 1st embodiment.

FIG. 11 is a schematic view of dispensing a glue material 183 according to the 1st embodiment. In FIG. 11, for every one of the second magnets 152 of the 1st embodiment, the opening portions 189 may be for the glue material 183 to be dispensed or applied to a contact between the second magnet 152 and the carrier 160, wherein the glue material 183 is a kind of adhesives without material limitations. Therefore, the preassembling of the second magnets 152 and the lower leaf springs 180 on the carrier 160 being finished before the glue dispensing is advantageous in effectively increasing the production smoothness and the dispensing accuracy. Specifically, for every one of the second magnets 152 of the 1st embodiment, the second magnet 152 is preassembled on the carrier 160 in a manner of being embedded in a cavity (its reference numeral is omitted) of the carrier 160, wherein the second magnet 152 and the cavity are both in a cuboid shape, and the second magnet 152 and the cavity are designed to tight fit, for example, each of four sides of the second magnet 152 in FIG. 11 is wider outwards by 1 mil than a corresponding one of four sides of the cavity, so that the second magnet 152 is pressed into the carrier 160 of a plastic material. After that, the glue material 183 is dispensed or applied to the contact between the second magnet 152 and the carrier 160 via the opening portions 189 by an injecting pin 105, so that the glue material 183 could penetrate into the tiny gaps resulted from the manufacturing tolerances of the contact between the second magnet 152 and the carrier 160, and thereby the second magnet 152 is fixedly disposed on the carrier 160. The glue material 183 also provides the carrier connecting section 187 of each of the lower leaf springs 180 to be fixedly connected to the carrier 160.

One of the opening portions 189 of each of the carrier connecting sections 187 may include an injecting pin guiding structure 189a. It can be said the injecting pin guiding structure 189a is a part of the one of the opening portions 189 specifically. Therefore, it is favorable for the accuracy of the glue dispensing position and the operation of the automatic equipment. More specifically, the injecting pin guiding structure 189a can be used to identify the position of the opening portion 189 and provide a reference point of the dispensing path in the glue dispensing step. In the 1st embodiment, for every one of the carrier connecting sections 187, each of two of the opening portions 189 located on two sides of the carrier connecting section 187 includes one injecting pin guiding structure 189a, and thereby it is favorable for dispensing the glue material 183 through the two of opening portions 189 respectively by two injecting pins 105 in the same time.

For every one of the opening portions 189, the injecting pin guiding structure 189a may be formed on the opening portion 189, and the injecting pin guiding structure 189a may be farther from the corresponding one of the second magnets 152 than the shielding portion 188 is from the corresponding one of the second magnets 152. Therefore, it is favorable for avoiding additional processing steps and manufacturing cost of the lower leaf springs 180, as well as preventing the glue material 183 with an excess quantity from overflowing to the shielding portion 188. Specifically, a position of the injecting pin guiding structure 189a may be identified by the image recognition method, and then the glue material 183 is dispensed by the injecting pin 105 in accordance with a predetermined dispensing path relative to the injecting pin guiding structure 189a.

For every one of the opening portions 189, the injecting pin guiding structure 189a may be a notch of the opening portion 189 and enlarge a range of the opening portion 189. Therefore, the opening portions 189 are advantageous in accommodating the glue material 183 with an excess quantity so as to effectively control the glue dispensing quality.

In FIG. 1 and FIG. 2, the lens driving apparatus 100 may further include the position detection unit 194, which is fixedly disposed near the base opening 193 and faces the second magnets 152, and thereby the position detection unit 194 is able to detect a displacement of the second magnets 152 along the first direction Z. Therefore, it is favorable for an autofocus mechanism required a short focusing time in a continuous low speed (CL) mode to save the space of the lens driving apparatus 100. Specifically, the position detection unit 194 may be fixedly disposed on a part other than the base 190, and the position detection unit 194 may be fixedly disposed around the base opening 193 of the base 190 as the 1st embodiment. A number of the position detection unit 194 in the 1st embodiment is one, wherein the position detection unit 194 faces one of the second magnets 152 along the first direction Z. Furthermore, the position detection unit 194 may be a Hall sensor, a Hall element, a magnetic field sensor, a photodetector or so on to detect a displacement or a magnetic field change. The position detection unit 194 in the 1st embodiment is the Hall sensor.

The lens driving apparatus 100 may further include a second coil 172 assembled with the base 190, wherein the second coil 172 and the first magnets 151 are arranged along the first direction Z, and the second coil 172 faces the first magnets 151, that is, a plane formed by the second coil 172 faces the first magnets 151. Therefore, it is favorable for reducing the mechanism space waste of the lens driving apparatus 100 so as to achieve the compact size. Specifically, the second coil 172 is for diving the carrier 160 and the first magnets 151 to be displaced along the second directions X and Y. The second coil 172 is a substrate wiring and assembled on one side of the base 190 close to the carrier 160.

The lens driving apparatus 100 may further include at least three metal suspension wires 140 parallel to the central axis (in practice, the metal suspension wires 140 may be primarily parallel to the central axis), that is, the metal suspension wires 140 are disposed along the first direction Z. The at least three metal suspension wires 140 are respectively corresponding to at least three first connecting portions 195 of the lens driving apparatus 100, and one end of each of the metal suspension wires 140 is fixedly connected to a corresponding one of the first connecting portions 195. The at least three metal suspension wires 140 are respectively corresponding to at least three second connecting portions 125 of the lens driving apparatus 100, and the other end of each of the metal suspension wires 140 is fixedly connected to a corresponding one of the second connecting portions 125. Therefore, the metal suspension wires 140 are advantageous to the lens assembly 200 to be smoothly displaced along the second directions X and Y (i.e. degrees of freedom orthogonal to the central axis) so as to avoid the mechanical friction abrasion of a conventional technique using a bearing.

All of the first connecting portions 195 may be located on the base 190 and made of a metal material. Therefore, it is favorable for simplifying the complexities of an optical anti-shake mechanism so as to reduce the unexpected tolerances resulted from more parts and avoid to affect the accuracy of the lens driving apparatus 100. Specifically, all of the first connecting portions 195 made of the metal material may be joined with a plastic part of the base 190 by an insert molding method.

All of the second connecting portions 125 may be located on the upper leaf springs 120. Therefore, the first coil 171 can serve as a conductive path for an external driving current being induced by current in first connecting portions 195, the metal suspension wires 140, and the upper leaf springs 120 of a metal material with the second connecting portions 125. In addition, an isolation element 104 may be disposed between each of the upper leaf springs 120 and the carrier 160 so as to reduce the mutual influences resulted from the differences between an assembling method of the metal material and an assembling method of the plastic material.

In the 1st embodiment, a number of the metal suspension wires 140 is four, wherein the metal suspension wires 140 are parallel to the central axis and respectively disposed at four corners in the metal cover 110. A number of the first connecting portions 195 is four, and the one end of each of the metal suspension wires 140 is fixedly connected to the corresponding one of the first connecting portions 195. A number of the second connecting portions 125 is four, and the other end of each of the metal suspension wires 140 is fixedly connected to the corresponding one of the second connecting portions 125.

In FIG. 2 and FIG. 6, each one of the first connecting portions 195 may include a C-shaped notch structure 196, and each one of the second connecting portions 125 may include a C-shaped notch structure 126. Therefore, it is favorable for enhancing the assembling or soldering efficiency of the metal suspension wires 140 and significantly reducing the production cost. Specifically, for every one of the first connecting portions 195, the C-shaped notch structure 196 is for a corresponding one of the metal suspension wires 140 to be shifted into the C-shaped notch structure 196 during assembling the lens driving apparatus 100. For every one of the second connecting portions 125, the C-shaped notch structure 126 is for a corresponding one of the metal suspension wires 140 to be shifted into the C-shaped notch structure 126 during assembling the lens driving apparatus 100. Comparing with a conventional assembling method of passing a metal suspension wire through a hole being punched of a connecting portion, the assembling method for the first connecting portions 195, the second connecting portions 125 and the metal suspension wires 140 according to the 1st embodiment of the present disclosure is favorable for enhancing the assembling conveniences and reducing the assembling difficulties of the lens driving apparatus 100. In addition, the C-shaped notch structure 196 and the corresponding one of the metal suspension wires 140, as well as the C-shaped notch structure 126 and the corresponding one of the metal suspension wires 140, can be further joined and fixed by a method such as welding, hot stamping, heated association or so on.

Figure 12:
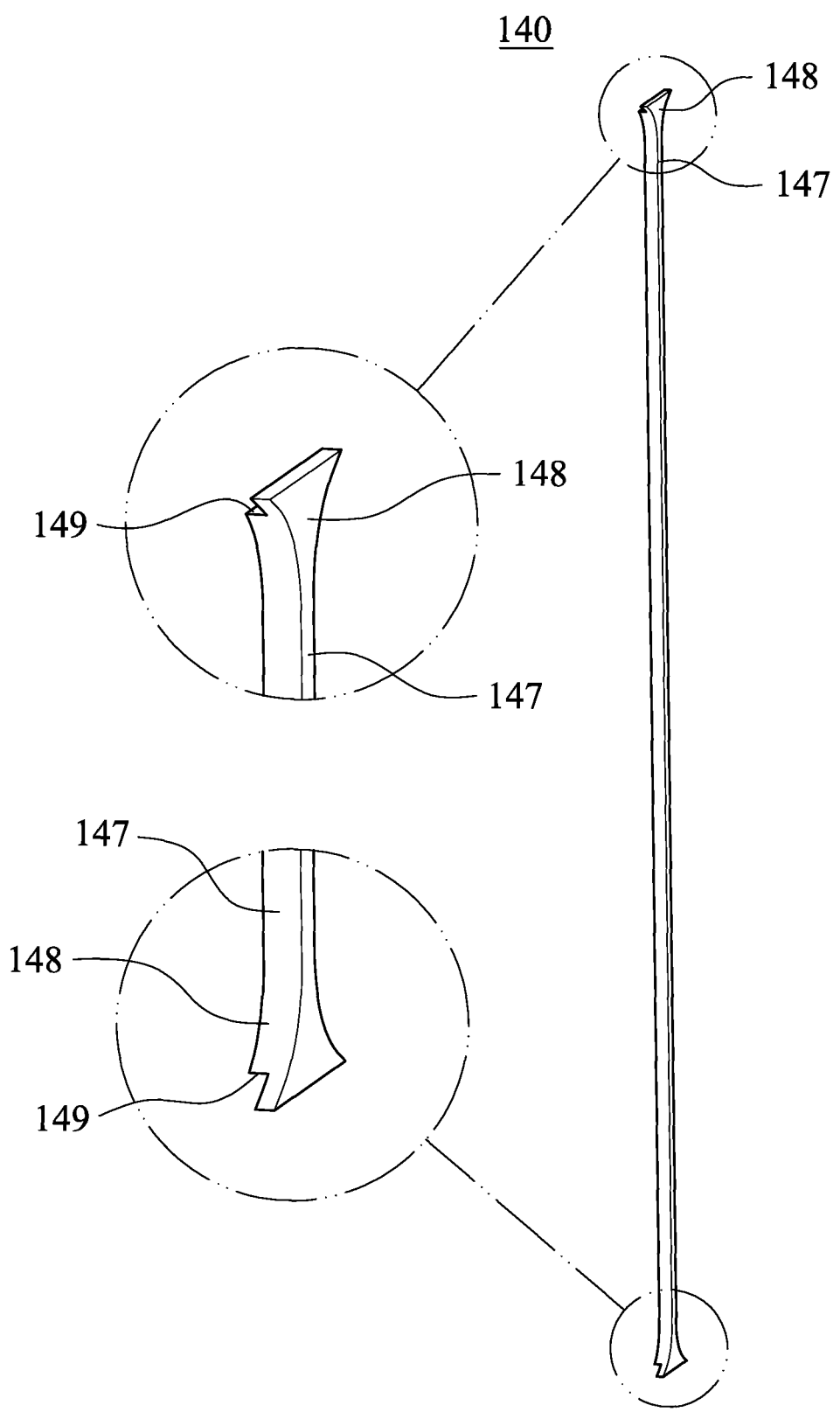
FIG. 12 is a three-dimensional view of each of the metal suspension wires according to the 1st embodiment.
Figure 13:
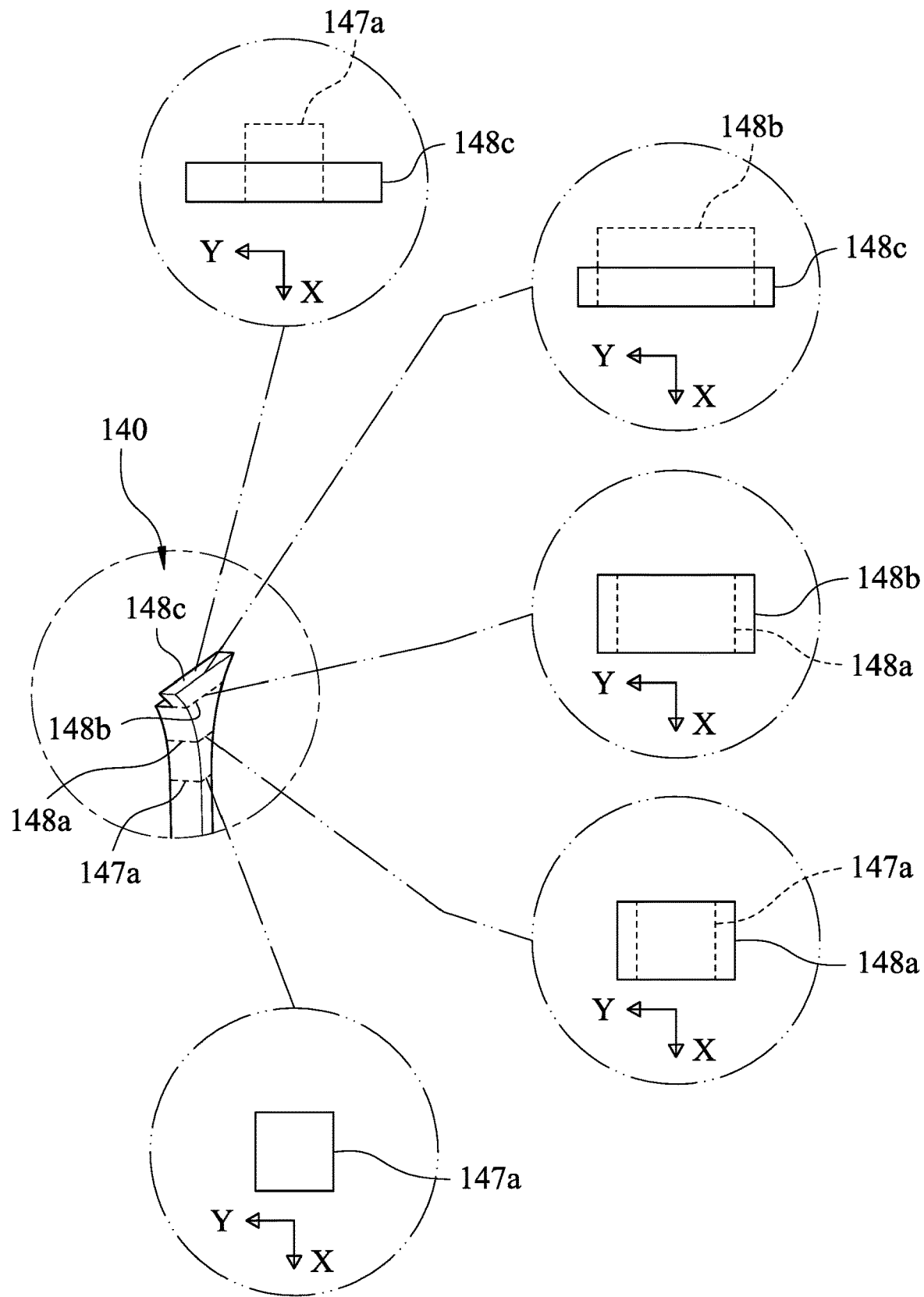
FIG. 13 shows cross-sectional schematic views of each of the metal suspension wires according to the 1st embodiment.

FIG. 12 is a three-dimensional view of each of the metal suspension wires 140 according to the 1st embodiment, and FIG. 13 shows cross-sectional schematic views of cross-sectional planes 147a, 148a, 148b and 148c of each of the metal suspension wires 140 according to the 1st embodiment, wherein FIG. 13 provides shape comparisons among the cross-sectional planes 147a, 148a, 148b and 148c. In FIG. 2, FIG. 12 and FIG. 13, a shape of a cross-sectional plane vertical to the central axis of each of the metal suspension wires 140 may be rectangular, i.e. rectangular or square. A viewing angle direction of a partial three-dimensional view of the metal suspension wire 140 in the central left of FIG. 13 is the same as viewing angle directions of FIG. 2 and FIG. 12. The cross-sectional planes 147a, 148a, 148b and 148c of the metal suspension wire 140 in FIG. 13 are all vertical to the central axis, and shapes of the cross-sectional planes 147a, 148a, 148b and 148c are all rectangular. Therefore, it is favorable for the automatic equipment to pick up the metal suspension wires 140. Furthermore, the cross-sectional planes vertical to the central axis of each of the metal suspension wires in this paragraph can be said the cross-sectional planes having normal directions parallel to the central axis (i.e. parallel to the first direction Z). The cross-sectional planes mentioned in the following paragraphs indicate the cross-sectional planes herein, which are vertical to the central axis and such as the cross-sectional planes 147a, 148a, 148b and 148c in FIG. 13.

For every one of the metal suspension wires 140, each of the two ends of the metal suspension wire 140 may include a broadening portion 148, and a shape of a cross-sectional plane of a middle portion 147 of the metal suspension wire 140 is different from a shape of a cross-sectional plane of the broadening portions 148. Specifically, the middle portion 147 connects the two broadening portions 148 respectively located on the two ends of the metal suspension wire 140, and for example, the shape of the cross-sectional plane 147a of the middle portion 147 is different from the shapes of the cross-sectional planes 148a, 148b and 148c of the broadening portion 148 in FIG. 13. There may be a length-width ratio variation among the shapes of the cross-sectional planes of each of the broadening portions 148. For example, the shapes of the cross-sectional planes 148a, 148b and 148c of the broadening portion 148 in FIG. 13 are different from each other, and it shows there is a length-width ratio variation among the shapes of the cross-sectional planes of each of the broadening portions 148 in the partial three-dimensional view of the metal suspension wire 140 in the central left of FIG. 13. Therefore, the broadening portions 148 are advantageous to the automatic equipment in raising the efficiency of picking up the metal suspension wires 140 and preventing the metal suspension wires 140 being overly thin from slipping. In the 1st embodiment, geometric structures of the four metal suspension wires 140 are the same, structures of the two broadening portions 148 of each of the metal suspension wires 140 are symmetrical with respect to the middle portion 147 thereof. A shape of every one of the cross-sectional planes of the middle portion 147 is the same as the shape of the cross-sectional plane 147a, and the shape of the cross-sectional plane 147a is square with substantially the same or approximate lengths of sides. Each of the broadening portions 148 broadens at least along the second direction Y in FIG. 13, for example, dimensions in the second direction Y of the cross-sectional planes 148a, 148b and 148c of the broadening portion 148 are all greater than a dimension in the second direction Y of the cross-sectional plane 147a of the middle portion 147 in FIG. 13. The shapes of the cross-sectional planes 148a, 148b and 148c are rectangular, which is alternately arranged by long sides and short sides.

In FIG. 1, FIG. 12 and FIG. 13, for every one of the metal suspension wires 140, a thickness of part of each of the broadening portions 148 may be different from a thickness of the middle portion 147. That is, each of the broadening portions 148 broadens at least along one direction (for example, the second direction Y in FIG. 13), and the part of each of the broadening portions 148, with respect to the middle portion 147, has a different dimension at least along another direction orthogonal to the one direction (for example, the second direction X in FIG. 13). The another direction orthogonal to the one direction can be taken as a direction of the thickness of each of the metal suspension wires 140. For example, a dimension in the second direction X of the cross-sectional plane 148c of the broadening portion 148 is different from a dimension in the second direction X of the cross-sectional plane 147a of the middle portion 147. Therefore, it enables to simultaneously pick up at least two metal suspension wires 140 while assembling the lens driving apparatus 100, and accurately control the relative distance between the two metal suspension wires 140 by taking the advantages of the characteristics in this paragraph and cooperating with the assembling equipment. Thus, it is favorable for stabilizing the parallelism among the metal suspension wires 140 in mass production. In the 1st embodiment, for every one of the metal suspension wires 140, the thickness of part of each of the broadening portions 148 is smaller than the thickness of the middle portion 147, for example, the dimension in the second direction X of the cross-sectional plane 148c of the broadening portion 148 is smaller than the dimension in the second direction X of the cross-sectional plane 147a of the middle portion 147 in FIG. 13.

For every one of the metal suspension wires 140, an outer end of each of the broadening portions 148 may include a step structure 149. Therefore, it is favorable for the assembling equipment to control the parallelism among the metal suspension wires 140, so as to reduce the tilt after the metal suspension wires 140 being fixedly connected to the base 190. In the 1st embodiment, for every one of the broadening portions 148, the step structure 149 can be shown by a dimensional difference in the second direction X between the cross-sectional planes 148b and 148c in FIG. 13.

The data of the aforementioned parameters of the lens driving apparatus 100 according to the 1st embodiment of the present disclosure are listed in the following Table 1, wherein the parameters are also shown as FIG. 8 to FIG. 10.

TABLE 1

| 1st Embodiment | | | |
|---|---|---|---|
| A (mm$^2$) | 0.1729 | Ae/A | 0.47 |
| Ae (mm$^2$) | 0.0813 | As/Ae | 1.13 |
| As (mm$^2$) | 0.0916 | | |

2nd Embodiment

Figure 14:
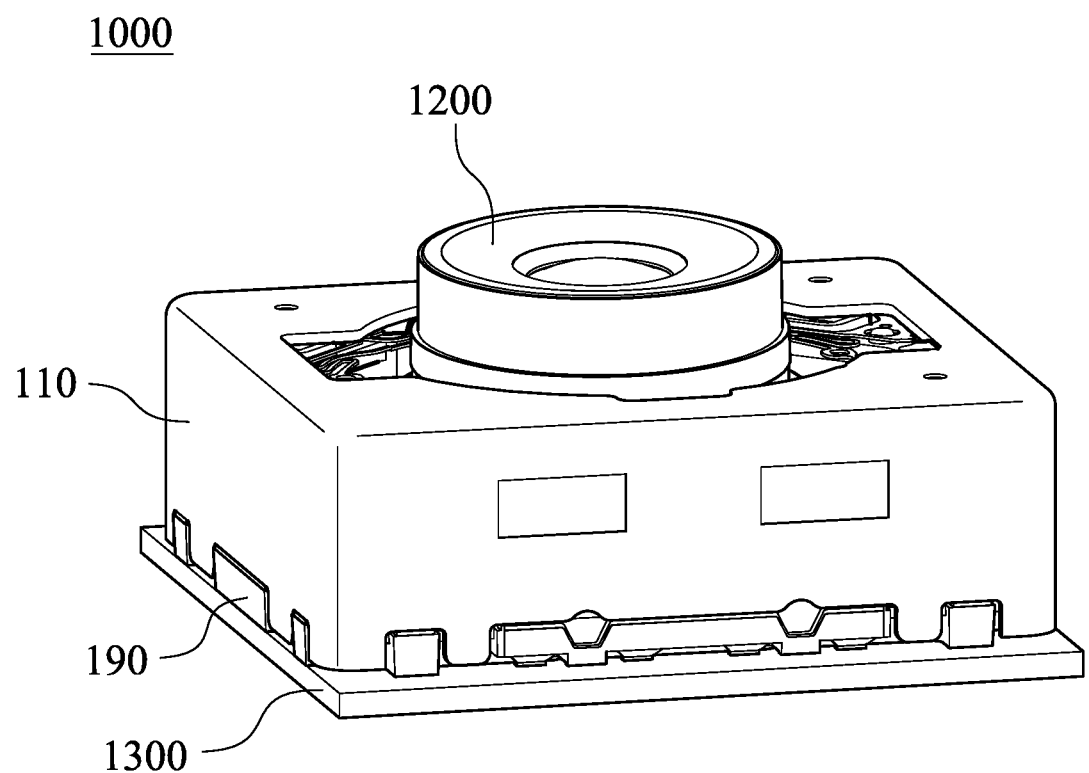
FIG. 14 is a schematic view of a photographing module according to the 2nd embodiment of the present disclosure.
Figure 15:
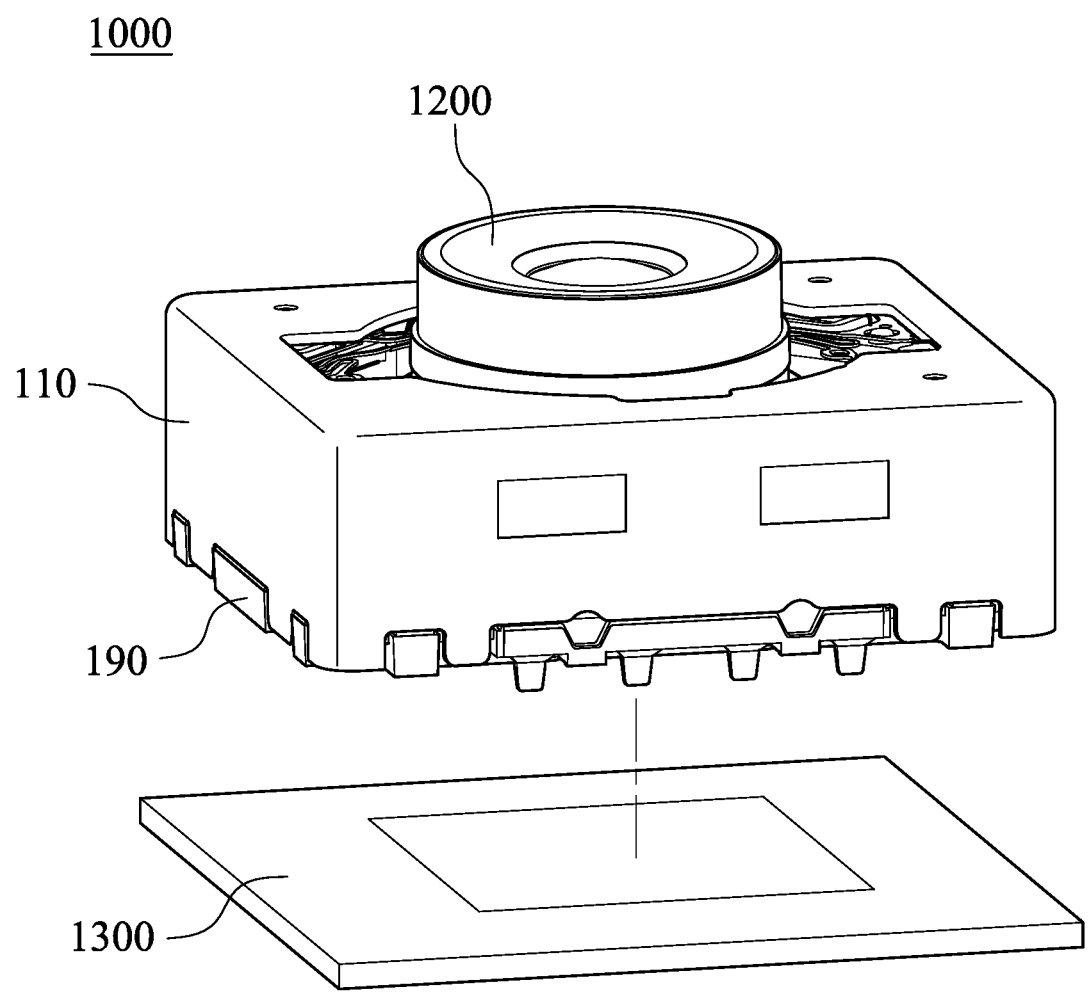
FIG. 15 is another schematic view of the photographing module according to the 2nd embodiment.

FIG. 14 is a schematic view of a photographing module 1000 according to the 2nd embodiment of the present disclosure, and FIG. 15 is another schematic view of the photographing module 1000 according to the 2nd embodiment. In FIG. 14 and FIG. 15, the photographing module 1000 includes the lens driving apparatus 100 of the 1st embodiment according to the present disclosure, a lens assembly 1200 and an image sensor 1300. The lens assembly 1200 includes at least one lens element and is assembled with the carrier 160 of the lens driving apparatus 100. The image sensor 1300 is attached to the base 190 of the lens driving apparatus 100 and for receiving an imaging light from the lens assembly 1200. Therefore, the lens driving apparatus 100 is advantageous in simultaneously satisfying the requirements of spatial arrangement and focusing accuracy of the photographing modules 1000 with compact sizes. The other details of the lens driving apparatus 100 has been described in the foregoing paragraphs of the 1st embodiment, and will not be described again herein.

3rd Embodiment

Figure 16:
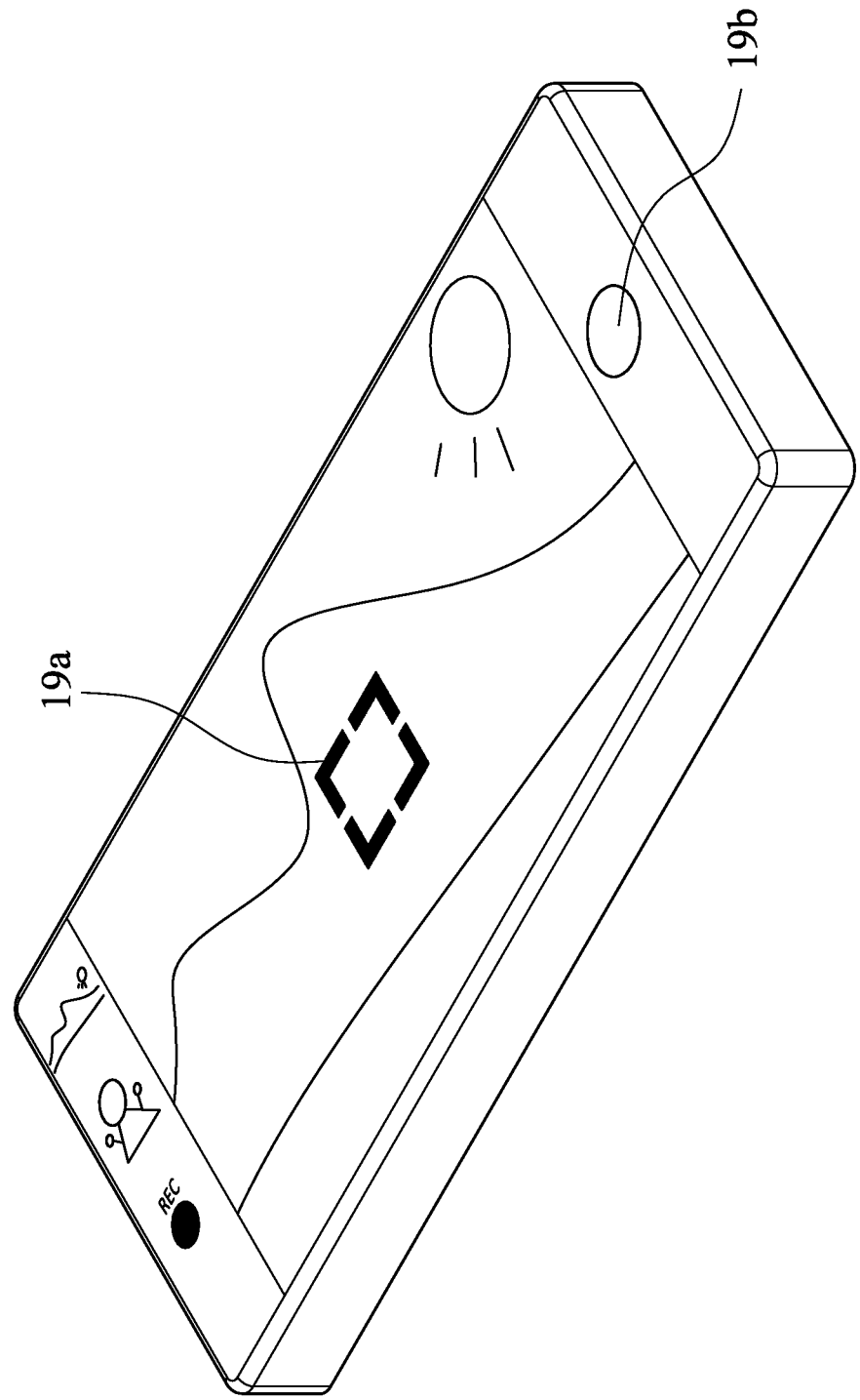
FIG. 16 shows a schematic view of an electronic device according to the 3rd embodiment of the present disclosure.
Figure 17:
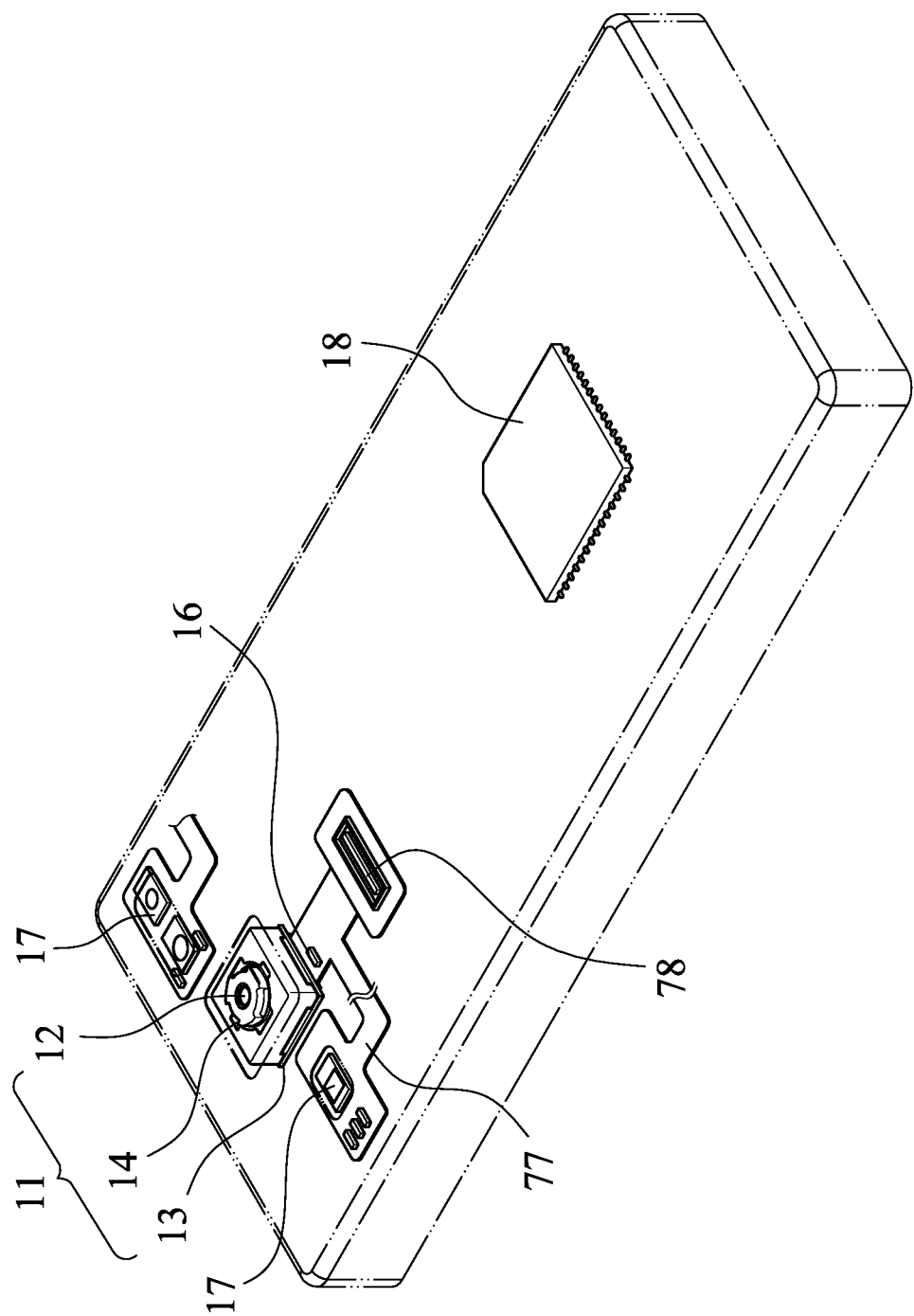
FIG. 17 shows another schematic view of the electronic device according to the 3rd embodiment.

FIG. 16 shows a schematic view of an electronic device 10 according to the 3rd embodiment of the present disclosure, FIG. 17 shows another schematic view of the electronic device 10 according to the 3rd embodiment, and particularly, FIG. 16 and FIG. 17 are schematic views related to a camera of the electronic device 10. In FIG. 16 and FIG. 17, the electronic device 10 of the 3rd embodiment is a smart phone, wherein the electronic device 10 includes a photographing module 11. The photographing module 11 includes a lens driving apparatus 14 according to the present disclosure, a lens assembly 12 and an image sensor 13, wherein the image sensor 13 is disposed on an image surface (not shown in drawings) of the lens assembly 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 3rd embodiment can be a touch screen 19a, a button 19b and etc. At this moment, the imaging light is converged on the image sensor 13 of the lens assembly 12, and the electronic signal associated with image is output to an image signal processor (ISP) 18.

Figure 18:
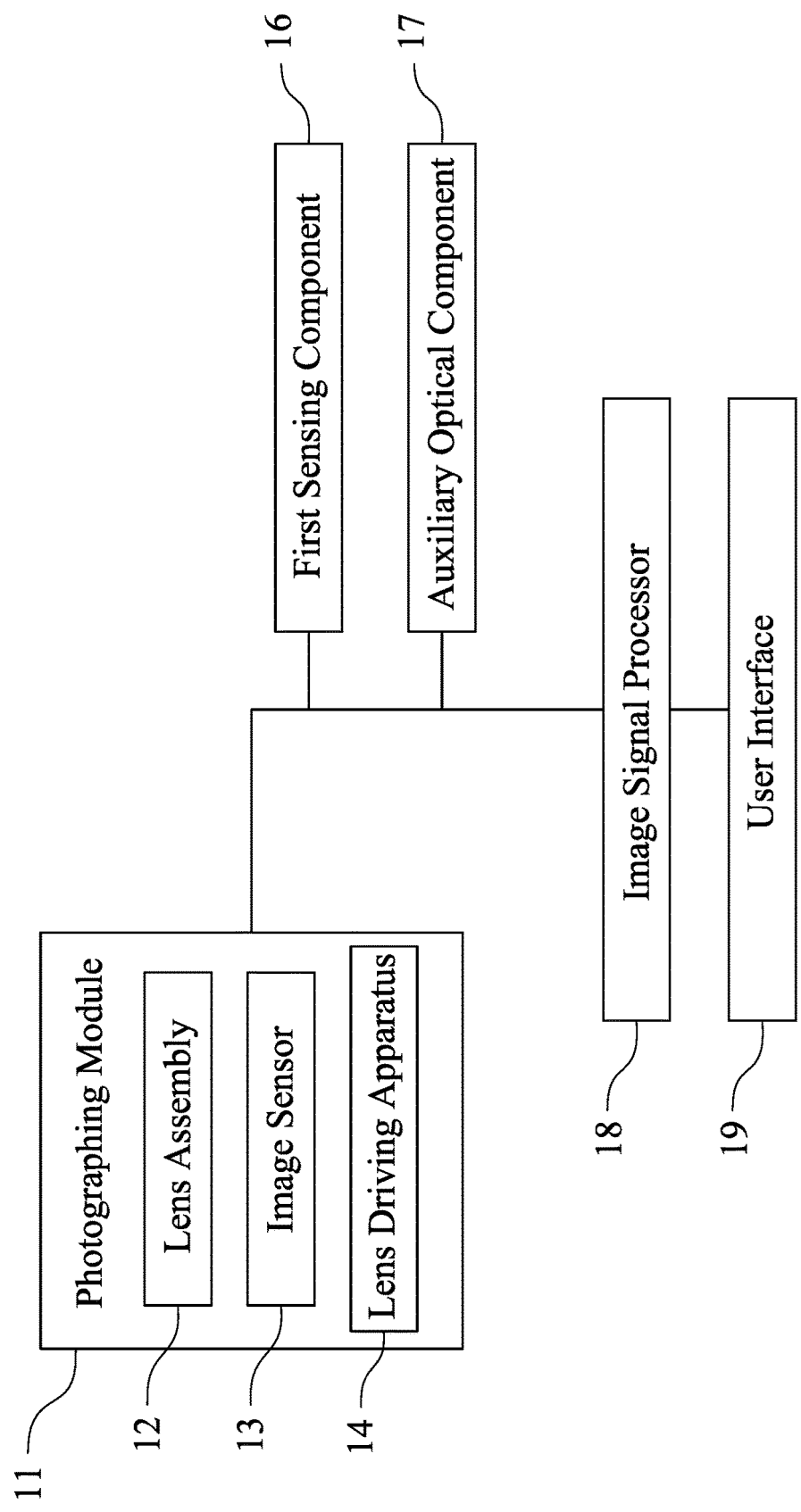
FIG. 18 shows a block diagram of the electronic device according to the 3rd embodiment.

FIG. 18 shows a block diagram of the electronic device 10 according to the 3rd embodiment, and in particular, the block diagram is related to the camera of the electronic device 10. In FIG. 16 to FIG. 18, the photographing module 11 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the lens driving apparatus 14 of the photographing module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 17, the photographing module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the photographing module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the photographing module can also be controlled more flexibly via the touch screen of the electronic device. In the 3rd embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

4th Embodiment

Figure 19:
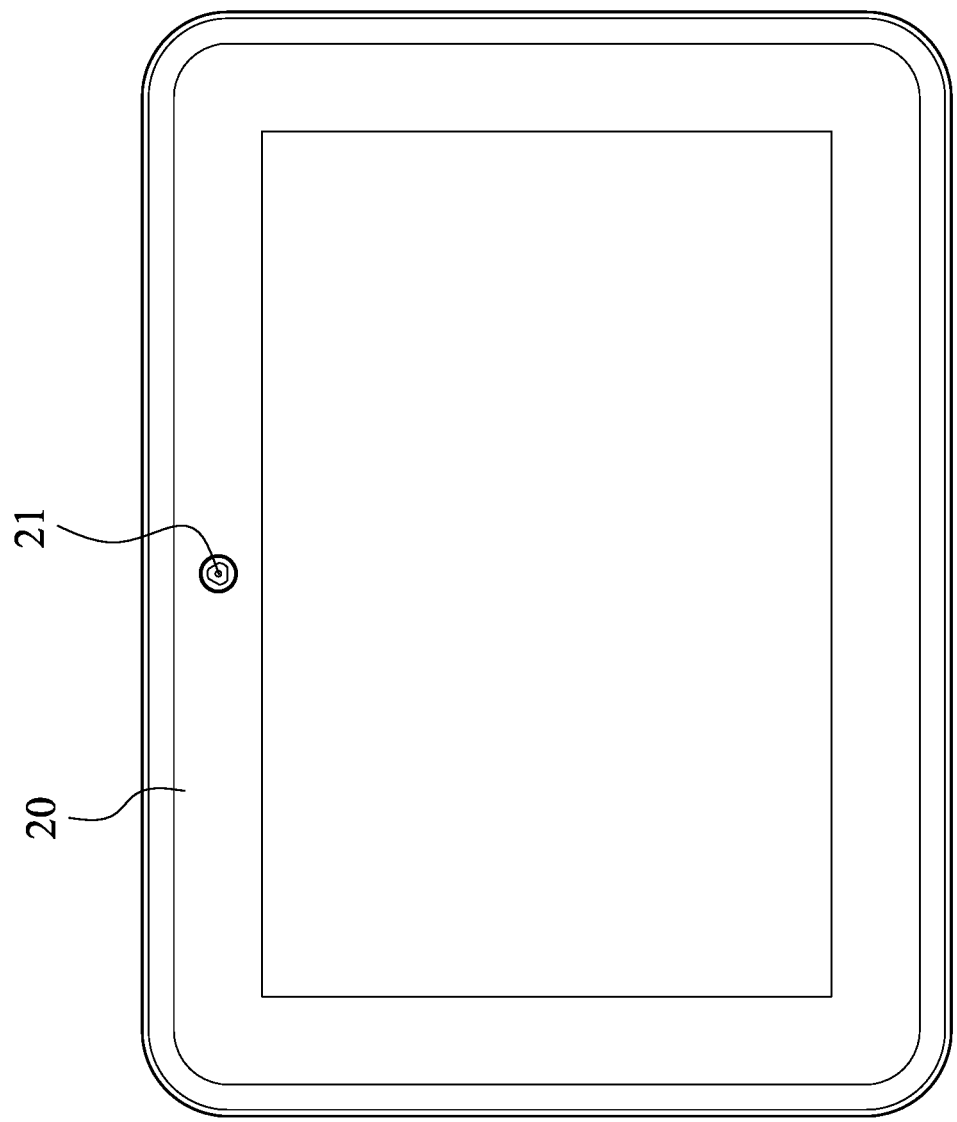
FIG. 19 shows an electronic device according to the 4th embodiment of the present disclosure.

FIG. 19 shows an electronic device 20 according to the 4th embodiment of the present disclosure. The electronic device 20 of the 4th embodiment is a tablet personal computer. The electronic device 20 includes a photographing module 21 according to the present disclosure.

5th Embodiment

Figure 20:
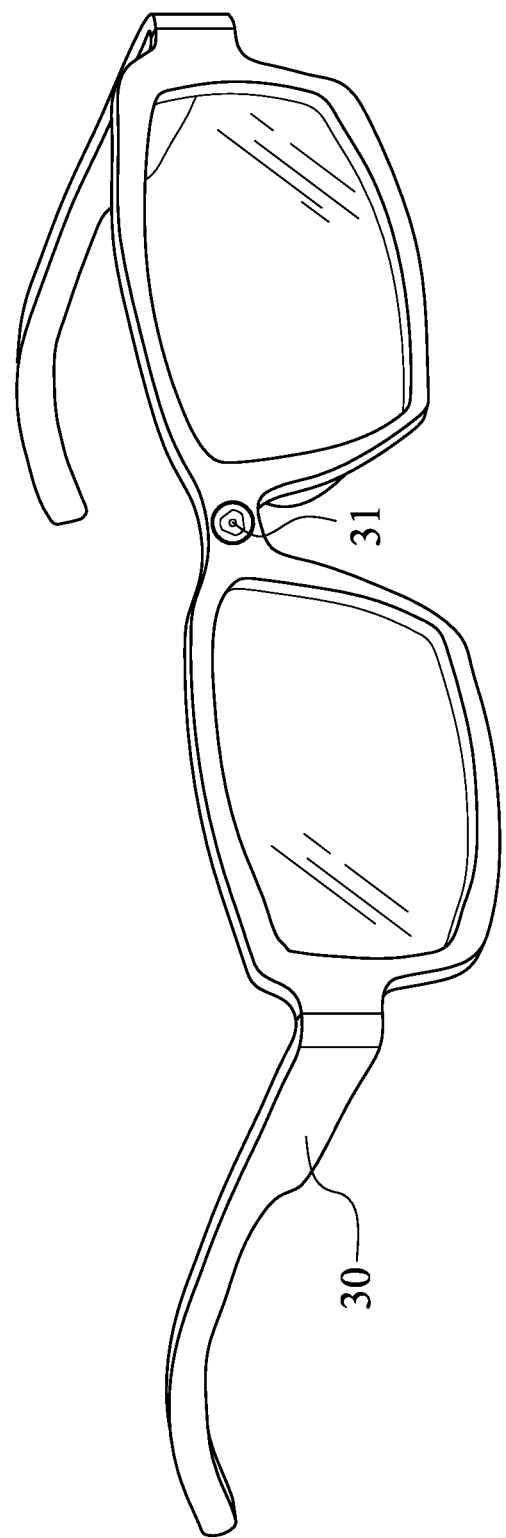
FIG. 20 shows an electronic device according to the 5th embodiment of the present disclosure.

FIG. 20 shows an electronic device 30 according to the 5th embodiment of the present disclosure. The electronic device 30 of the 5th embodiment is a wearable device. The electronic device 30 includes a photographing module 31 according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. A lens driving apparatus, which is for driving a lens assembly, the lens driving apparatus comprising:
   a base comprising a base opening;
   a metal cover coupling to the base and comprising a cover opening, wherein the cover opening is disposed correspondingly to the base opening;
   a carrier having a central axis, wherein the carrier is for being assembled with the lens assembly, the carrier is displaceable relative to the base and disposed in the metal cover, and the carrier is displaceable at least along a first direction, which is parallel to the central axis;
   a first coil wound around and fixedly disposed on the carrier;
   at least one first magnet disposed around the first coil, wherein the first magnet is displaceable relative to the base and disposed in the metal cover, and the first magnet is displaceable at least along a second direction, which is vertical to the central axis;
   at least one second magnet fixedly disposed on one side of the carrier close to the base, wherein the second magnet is displaceable with the carrier, and the second magnet is disposed without corresponding to the first coil and any other coil that are for driving;
   a frame accommodating the first magnet to be fixedly disposed thereon; and
   a spring set connected to the carrier, wherein the spring set comprises at least one upper leaf spring and at least one lower leaf spring, the upper leaf spring and the lower leaf spring are arranged along the first direction, and the lower leaf spring is disposed on the side of the carrier close to the base and comprises:
   a frame connecting section fixedly connected to the frame;
   a carrier connecting section fixedly connected to the carrier, wherein the carrier connecting section and the second magnet are arranged along the first direction, the carrier connecting section comprises an opening portion and a shielding portion, and the opening portion and the shielding portion both corresponding to the second magnet along the first direction are respectively for a part of the second magnet to be exposed through the opening portion and another part of the second magnet to be shielded by the shielding portion; and
   a resilient section connecting the frame connecting section and the carrier connecting section.

2. The lens driving apparatus of claim 1, wherein an area projected along the first direction of the second magnet is A, an area projected along the first direction of the part of the second magnet exposed through the opening portion is Ae, and the following condition is satisfied:

$$10\% < (Ae/A) \times 100\% < 90\%.$$

3. The lens driving apparatus of claim 1, wherein an area projected along the first direction of the another part of the second magnet shielded by the shielding portion is As, an area projected along the first direction of the part of the second magnet exposed through the opening portion is Ae, and the following condition is satisfied:

$$0.5 < As/Ae < 2.0.$$

4. The lens driving apparatus of claim 2, wherein the opening portion is for a glue material to be dispensed to a contact between the second magnet and the carrier.

5. The lens driving apparatus of claim 4, wherein the opening portion comprises an injecting pin guiding structure.

6. The lens driving apparatus of claim 5, wherein the injecting pin guiding structure is formed on the opening portion, and the injecting pin guiding structure is farther from the second magnet than the shielding portion is from the second magnet.

7. The lens driving apparatus of claim 5, wherein the injecting pin guiding structure is a notch of the opening portion and enlarges a range of the opening portion.

8. The lens driving apparatus of claim 2, further comprising:
   a position detection unit fixedly disposed near the base opening and facing the second magnet.

9. The lens driving apparatus of claim 2, further comprising:
   a second coil assembled with the base, wherein the second coil and the first magnet are arranged along the first direction, and the second coil faces the first magnet.

10. The lens driving apparatus of claim 9, further comprising:
    at least three metal suspension wires parallel to the central axis, wherein the metal suspension wires are respectively corresponding to at least three first connecting portions of the lens driving apparatus, one end of each of the metal suspension wires is fixedly connected to a corresponding one of the first connecting portions, the metal suspension wires are respectively corresponding to at least three second connecting portions of the lens driving apparatus, and the other end of each of the metal suspension wires is fixedly connected to a corresponding one of the second connecting portions.

11. The lens driving apparatus of claim 10, wherein all of the first connecting portions are located on the base and made of a metal material.

12. The lens driving apparatus of claim 10, wherein all of the second connecting portions are located on the upper leaf spring.

13. The lens driving apparatus of claim 10, wherein each of the first connecting portions and the second connecting portions comprises a C-shaped notch structure.

14. The lens driving apparatus of claim 10, wherein a shape of a cross-sectional plane vertical to the central axis of each of the metal suspension wires is rectangular.

15. The lens driving apparatus of claim 14, wherein each of the two ends of each of the metal suspension wires comprises a broadening portion, a shape of a cross-sectional plane of a middle portion of each of the metal suspension wires is different from a shape of a cross-sectional plane of the broadening portions, and there is a length-width ratio variation among the shapes of the cross-sectional planes of each of the broadening portions.

16. The lens driving apparatus of claim 15, wherein a thickness of part of each of the broadening portions is different from a thickness of the middle portion.

17. The lens driving apparatus of claim 15, wherein an outer end of each of the broadening portions comprises a step structure.

18. A photographing module, comprising:
    the lens driving apparatus of claim 1;
    the lens assembly assembled with the carrier of the lens driving apparatus; and
    an image sensor attached to the base of the lens driving apparatus and being for receiving an imaging light from the lens assembly.

19. An electronic device, comprising:
    the photographing module of claim 18.

* * * * *